US006691666B1

(12) United States Patent
Berr et al.

(10) Patent No.: US 6,691,666 B1
(45) Date of Patent: Feb. 17, 2004

(54) MULTIPART COOLED PISTON FOR A COMBUSTION ENGINE AND METHOD FOR MANUFACTURE THEREOF

(75) Inventors: Gerhard Berr, Aspach (DE); Armin Ihle, Asch (DE); Henk Ravenshorst, Västra Frölunda (SE); Magnus Horn, Särö (SE); Lars Lundin, Göteborg (SE)

(73) Assignees: Mahle GmbH, Stuttgart (DE); Volvo Powertrain Corp., Gothenburg (SE); Hirschvogel Umformtechnik GmbH, Denklingen (DE)

( * ) Notice: Subject to any disclaimer, the term of this patent is extended or adjusted under 35 U.S.C. 154(b) by 0 days.

(21) Appl. No.: 10/349,273

(22) Filed: Jan. 22, 2003

(30) Foreign Application Priority Data

Sep. 25, 2002 (DE) ........................................ 102 44 513

(51) Int. Cl.[7] ................................................ B23P 13/02
(52) U.S. Cl. ...................................... 123/193.6; 92/186
(58) Field of Search ......................... 123/193.6; 92/186, 92/158, 159, 216–231

(56) References Cited

U.S. PATENT DOCUMENTS 3,703,126 A * 11/1972 Haug .......................... 92/186
4,581,983 A * 4/1986 Moebus ....................... 92/186
5,261,363 A * 11/1993 Kamnitz .................. 123/193.6
5,546,896 A * 8/1996 Zaiser ...................... 123/193.6
6,164,261 A * 12/2000 Kruse ...................... 123/193.6

FOREIGN PATENT DOCUMENTS

JP 61 175 255 8/1986
WO WO 00 77379 12/2000

* cited by examiner

*Primary Examiner*—Marguerite McMahon
(74) *Attorney, Agent, or Firm*—Collard & Roe, P.C.

(57) ABSTRACT

In a multipart cooled piston (20) for a combustion engine with a piston upper part (1) of steel comprising a combustion bowl (3) and a ring wall (4) with ring belt (11), and with a piston lower part (2) comprising a piston skirt (9), pin bosses (12) for receiving the piston pin connecting the piston (20) to the connecting rod, and pin boss supports (6) connected to the piston skirt (9), and in a method for manufacture of such a piston (20), inexpensive manufacture and good form stability are to be achieved in that a cooling channel (7) formed inside the piston upper part (1) has forged supporting ribs (8) in its area extending to the combustion bowl (3), which each form sections of an all-round ring rib (5) with a connection surface radially to the longitudinal piston axis (K), in that the piston lower part (2) has an annular and all-round carrier rib (10) with a connection surface connected to the pin boss supports (6), and in that the piston upper part (1) and the piston lower part (2) are non-detachably connected by means of the connection surfaces of the ring rib (5) and the carrier rib (10).

9 Claims, 1 Drawing Sheet

Figure 5:
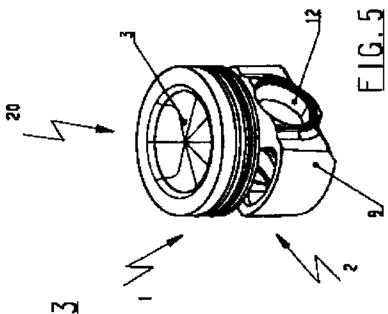

MULTIPART COOLED PISTON FOR A COMBUSTION ENGINE AND METHOD FOR MANUFACTURE THEREOF

The invention relates to a multipart cooled piston for a combustion engine with a piston upper part of forged steel comprising a combustion bowl and a ring wall with ring belt, and with a piston lower part comprising a piston skirt, pin bosses for receiving the piston pin connecting the piston to the connecting rod, and pin boss supports connected to the piston skirt, and to a method for manufacture of a piston of this type.

A multipart cooled piston for a combustion engine is known from JP 61175255 A. This piston has at the level of the ring belt of the piston a number of ribs, between which is arranged a thermally insulating plate for minimization of the heat transfer from the combustion chamber bowl to the ring belt.

From WO 00/77379 A1, a further piston for a combustion engine is known which has a wall section with several transverse walls made of thin metal sheet and radially arranged in order to improve the heat dissipation in the cooling channel.

The above designs are not suitable for improvement of the piston in respect of its stability for high ignition pressures and temperatures as encountered in modern diesel engines.

The object underlying the present invention is therefore to provide a piston concept for a multipart cooled piston with which inexpensive manufacture is assured and with which piston deformation due to the effects of high gas pressures and temperatures can be effectively countered.

The solution to the problem is set forth in the independent claims.

In accordance with the invention, a method is indicated for manufacture of a multipart cooled piston in which the piston upper part is provided, by forging of a blank, with supporting ribs in the cooling channel that each form sections of an all-round ring rib radially to the longitudinal piston axis. The piston upper part furthermore comprises a combustion bowl and a ring wall with ring belt. Following this, the blank forged in this way is prepared for connection by machining of the connecting surface.

A forged piston lower part comprising pin bosses, pin boss support and piston skirt is provided with an annular and all-round carrier rib connecting the pin boss supports, and is likewise prepared for connection after the forging process. The subsequent joining or connection of the ring rib of the piston upper part to the carrier rib of the piston lower part is achieved by means of a welding or soldering process. Then the piston blank connected in this way is finish-machined into a piston usable for an engine.

Advantageously, the supporting ribs can be made or arranged radially symmetrically and/or non-symmetrically spread over the circumference of the cooling channel, for example by a larger number thereof in the major/minor thrust direction of the piston. With a piston manufactured in this way, the cooling channel can be formed closer towards the piston crown or combustion bowl and nevertheless has excellent form stability. In addition, the arrangement of the supporting ribs effects a kind of chamber formation inside the cooling channel, i.e. creates shaker areas, whereby a prolongation of the dwell time of the cooling oil is achieved and hence an improved heat dissipation of the piston areas to be cooled.

With the solution in accordance with the invention, piston upper parts of heat-resistant steel and piston lower parts comprising forged AFP steel can be manufactured and connected in a particularly simple and inexpensive way.

Advantageous embodiments are the subject-matter of sub-claims.

Figure 3:
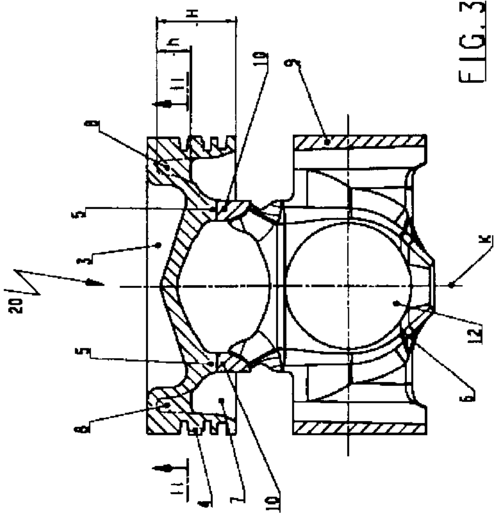
Figure 4:
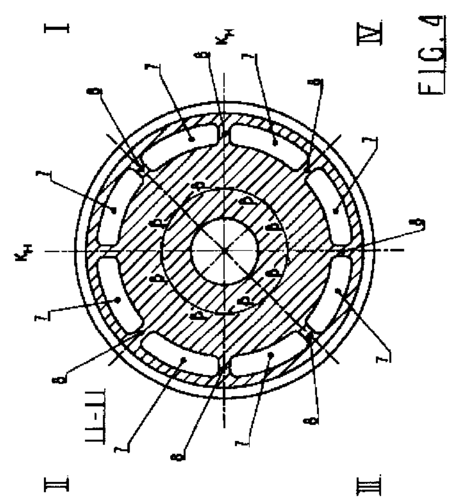
Figure 1:
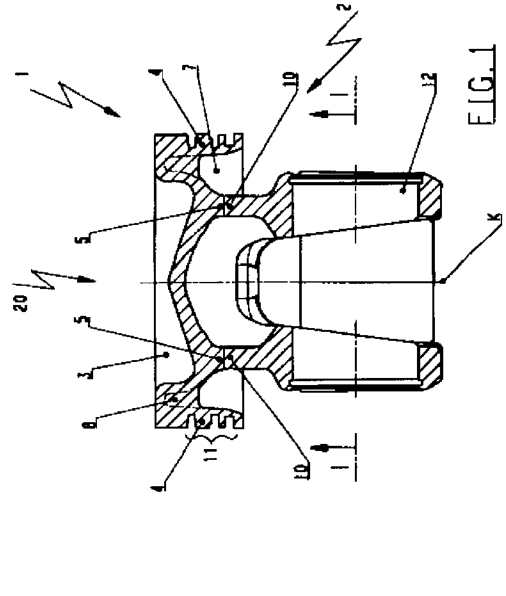
Figure 2:
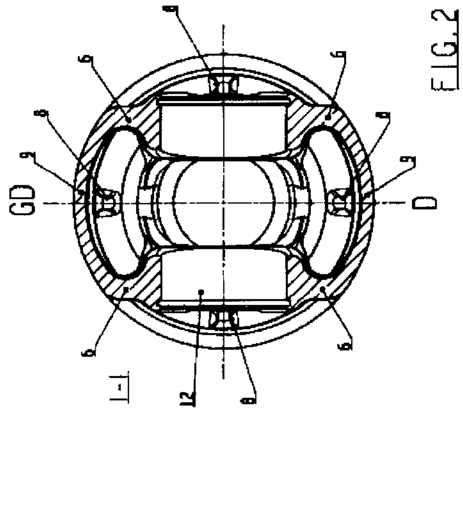

The invention is explained in more detail in the following on the basis of an embodiment. The drawing shows in:

FIG. 1 a piston in accordance with the invention, in a cross-section in the pin direction;

FIG. 2 a piston in accordance with the invention from below, in a section along the line I—I in FIG. 1;

FIG. 3 a piston in accordance with the invention, in a cross-section transverse to the piston pin direction;

FIG. 4 a piston in accordance with the invention, in a section along the line II—II in FIG. 3;

FIG. 5 a piston in accordance with the invention, in a perspective view.

The multipart cooled piston 20 in accordance with the invention comprises a forged piston upper part 1 with a combustion bowl 3, ring wall 4 with ring belt 11, and a cooling channel 7, and a piston lower part comprising a piston skirt 9 and pin boss supports 6, as shown in FIG. 5. In the cooling channel 7, supporting ribs 8 are provided which are arranged in the area towards the piston crown and extend in the direction of the cooling channel 7. The height h of the supporting ribs 8 is here not more than half the total height H of the cooling channel 7, so that an unhindered circulation of cooling oil remains assured. Thanks to this design, shaker areas are created for the cooling oil which increase the cooling effect.

As shown in FIGS. 3 and 4, the supporting ribs 8 merge radially to the longitudinal piston axis K into sections of a ring rib 5, which taken together form said ring rib 5.

The supporting ribs 8 are, as shown in FIG. 4, arranged radially symmetrically spread over the circumference of the cooling channel 7, with an angle $\beta$ of 45 angular degrees relative to the main piston axes $K_H$. In a further embodiment (not shown), the spread of the supporting ribs 8 can be such that in the major/minor thrust direction of the piston D or GD a larger number of supporting ribs 8 is arranged than transversely thereto, i.e., a non-symmetrical spread in the cooling channel 7 is achieved on the circumferential side. In this way, the spread of the supporting ribs 8 in the cooling channel 7 can, if the latter is characterized by the quadrants I–IV formed by the main piston axes $K_H$ (FIG. 4), be such that within a quadrant a symmetrical or non-symmetrical spread is achieved, which is reproduced in the opposite quadrants, i.e. I. and III. or II. and IV., in order to cope with the corresponding temperature and tension requirements in the piston 20 in the case of loading.

An annular and all-round carrier rib 10 is formed from the pin boss supports 6, as shown in FIG. 3, and corresponds in its geometrical dimensions to the ring rib 5. The piston upper part 1 and the piston lower part 2 are non-detachably connected to one another by the carrier rib 10 and ring rib 5 by means of a welding or soldering process. The piston upper part 1 is advantageously made from an oxidation-resistant and/or heat-resistant material and the piston lower part 2 from a precipitation-hardening ferritic-perlitic steel or tempered steel.

As regards the method, the manufacture of the piston is characterized by the steps forging of a blank for manufacture of a piston upper part 1 with supporting ribs 8 in the cooling channel 7, which each form sections of an all-round ring rib 5 radially to the longitudinal piston axis K;

machining of the connection surface of the ring rib 5 by metal-cutting methods;

forging of a blank for manufacture of a piston lower part 2 with an annular and all-round connection surface of the carrier rib 10 connected to the pin boss supports 6;

machining of the connection surface of the carrier rib 10 by metal-cutting methods;

connecting of the ring rib 5 of the piston upper part 1 to the carrier rib 10 of the piston lower part 2;

finish-machining of the connected piston 20.

It is clear to a person skilled in this art that the method for manufacture of the piston upper and lower parts 1 and 2 usually begins with the upsetting of a steel rod section, a so-called billet, subsequent shaping and pre-engraving, for manufacture of the individual elements of the respective piston part, such as cooling channel 7, supporting ribs 8, combustion bowl 3 or pin support 6 etc., final engraving, in which material overhangs are removed, subsequent deburring, followed by heat treatment for reducing the tension in the material, cleaning of the forged piston parts, for example by sandblasting, and subsequent machining of the connection surfaces by metal-cutting methods.

The piston upper part 1 and piston lower part 2 manufactured in this way are non-detachably connected by means of a welding or soldering process using the connection surfaces of the ring rib 5 and the carrier rib 10, with finish-machining of the piston 20 into a piston usable in an engine then being performed using metal-cutting methods.

Reference characters

Multipart cooled piston 20
Piston upper part 1
Piston lower part 2
Combustion bowl 3
Ring wall 4
Ring rib 5
Pin boss support 6
Cooling channel 7
Supporting rib 8
Piston skirt 9
Carrier rib 10
Ring belt 11
Pin boss 12
Longitudinal piston axis K
Main piston axes $K_H$
Cooling channel height H
Height of supporting ribs h
Major/minor thrust direction of piston D, GD

What is claimed is:

1. Method for manufacture of multipart cooled piston (20) for a combustion engine with a piston upper part (1) of steel comprising a combustion bowl (3) and a ring wall (4) with ring belt (11), and with a piston lower part (2) comprising a piston skirt (9), pin bosses (12) for receiving the piston pin connecting the piston (20) to the connecting rod, and pin boss supports (6) connected to the piston skirt (9), characterized by the features, forging of a blank for manufacture of a piston upper part (1) with supporting ribs (8) provided in the cooling channel (7), which each form sections of an all-round ring rib (5) which has a connection surface radially external to the longitudinal piston axis (K);

machining of the connection surface of the ring rib (5) by metal-cutting methods;

forging of a blank for manufacture of a piston lower part (2) with an annular and all-round connection surface of the carrier rib (10) connected to the pin boss supports (6);

machining of the connection surface of the carrier rib (10) by metal-cutting methods;

connecting of the ring rib (5) of the piston upper part (1) to the carrier rib (10) of the piston lower part (2);

finish-machining of the connected piston (20).

2. Method according to claim 1, wherein the supporting ribs (8) are radially symmetrically and/or non-symmetrically spread over the circumference of the cooling channel (7).

3. Method according to claim 1, wherein the supporting ribs (8) are of a height (h) which is no more than half the total height (H) of the cooling channel (7).

4. Method according to claim 1, wherein connection is achieved by means of a welding or soldering process.

5. Piston (20) according to claim 1, wherein the piston upper part (1) comprises an oxidation-resistant and/or heat-resistant material and the piston lower part (2) a precipitation-hardening ferritic-perlitic steel or tempered steel.

6. Multipart cooled piston (20) for a combustion engine with a piston upper part (1) of forged steel comprising a combustion bowl (3) and a ring wall (4) with ring belt (11), and with a piston lower part (2) comprising a piston skirt (9), pin bosses (12) for receiving the piston pin connecting the piston (20) to the connecting rod, and pin boss supports (6) connected to the piston skirt (9), wherein a cooling channel (7) formed inside the piston upper part (1) has forged supporting ribs (8) in its area extending to the combustion bowl (3), which each form sections of an all-round ring rib (5) which has a connection surface radially external to the longitudinal piston axis (K);

the piston lower part (2) has an annular and all-round carrier rib (10) with a connection surface connected to the pin boss supports (6), and the piston upper part (1) and the piston lower part (2) are non-detachably connected by means of the connection surfaces of the ring rib (5) and the carrier rib (10).

7. Piston (20) according to claim 6, wherein the supporting ribs (8) are arranged symmetrically and/or non-symmetrically spread over the circumference of the cooling channel (7).

8. Piston (20) according to claim 6, wherein the supporting ribs (8) are of a height (h) which is no more than half the total height (H) of the cooling channel (7).

9. Piston (20) according to claim 6, wherein the non-detachable connection of the piston upper and lower parts (1, 2) is a welded or soldered connection.

* * * * *